(12) United States Patent
Watanabe

(10) Patent No.: US 7,636,173 B2
(45) Date of Patent: Dec. 22, 2009

(54) IMAGE INPUT APPARATUS, UI CONTROL METHOD THEREOF, AND IMAGE OUTPUT APPARATUS

(75) Inventor: Hitoshi Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 829 days.

(21) Appl. No.: 10/629,709

(22) Filed: Jul. 30, 2003

(65) Prior Publication Data
US 2004/0021901 A1 Feb. 5, 2004

(30) Foreign Application Priority Data
Aug. 5, 2002 (JP) .............................. 2002-228027

(51) Int. Cl.
G06F 3/12 (2006.01)
H04N 1/60 (2006.01)
(52) U.S. Cl. ...................................... 358/1.15; 358/1.9
(58) Field of Classification Search .................. 358/1.1, 358/1.9, 1.11–1.18
See application file for complete search history.

(56) References Cited

U.S. PATENT DOCUMENTS

| 5,369,746 | A | | 11/1994 | Nakamura et al. ........... 395/200 |
| 5,579,495 | A | | 11/1996 | Ozawa et al. ................ 395/383 |
| 5,832,298 | A | | 11/1998 | Sanchez et al. ................. 710/8 |
| 5,887,173 | A | | 3/1999 | Ogawa et al. ................ 395/704 |
| 6,115,137 | A | * | 9/2000 | Ozawa et al. .................. 358/1.6 |
| 6,717,689 | B1 | | 4/2004 | Endo et al. .................. 358/1.15 |
| 7,027,172 | B1 | * | 4/2006 | Parulski et al. .............. 358/1.15 |
| 2001/0022624 | A1 | | 9/2001 | Tanaka et al. ........... 348/333.02 |
| 2001/0040684 | A1 | | 11/2001 | Takahashi ..................... 358/1.2 |
| 2002/0085223 | A1 | * | 7/2002 | Bigi ........................... 358/1.13 |
| 2002/0093682 | A1 | | 7/2002 | Nakajima ................... 358/1.16 |
| 2003/0002072 | A1 | * | 1/2003 | Berkema et al. ............ 358/1.15 |
| 2003/0043204 | A1 | * | 3/2003 | Aguilera et al. .............. 345/810 |
| 2003/0161641 | A1 | * | 8/2003 | Edmonds ...................... 399/23 |
| 2006/0087568 | A1 | | 4/2006 | Tanaka et al. ........... 348/231.99 |
| 2007/0139526 | A1 | * | 6/2007 | Parulski et al. ......... 348/207.99 |

FOREIGN PATENT DOCUMENTS

| JP | 09-026867 | 1/1997 |
| JP | 11-085422 | 3/1999 |
| JP | 2000-137593 | 5/2000 |
| JP | 2001-268485 | 9/2001 |
| JP | 2002-211082 | 7/2002 |

OTHER PUBLICATIONS

White Paper of CIPA-001-2003. Digital Photo Solutions for Imaging Devices. Feb. 3, 2003.*

* cited by examiner

Primary Examiner—Thierry L Pham
(74) Attorney, Agent, or Firm—Fitzpatrick, Cella, Harper & Scinto

(57) ABSTRACT

An image input apparatus is capable of directly transmitting a digital image to an image output apparatus. The image input apparatus includes an obtaining unit, a user interface selector and a display unit. The obtaining unit obtains from the image output apparatus, capability information including information related to an image outputting function of the image output apparatus. The user interface selector selects, based on the capability information obtained by the obtaining unit, a user interface for controlling the image output apparatus. The display unit displays the selected user interface.

6 Claims, 13 Drawing Sheets

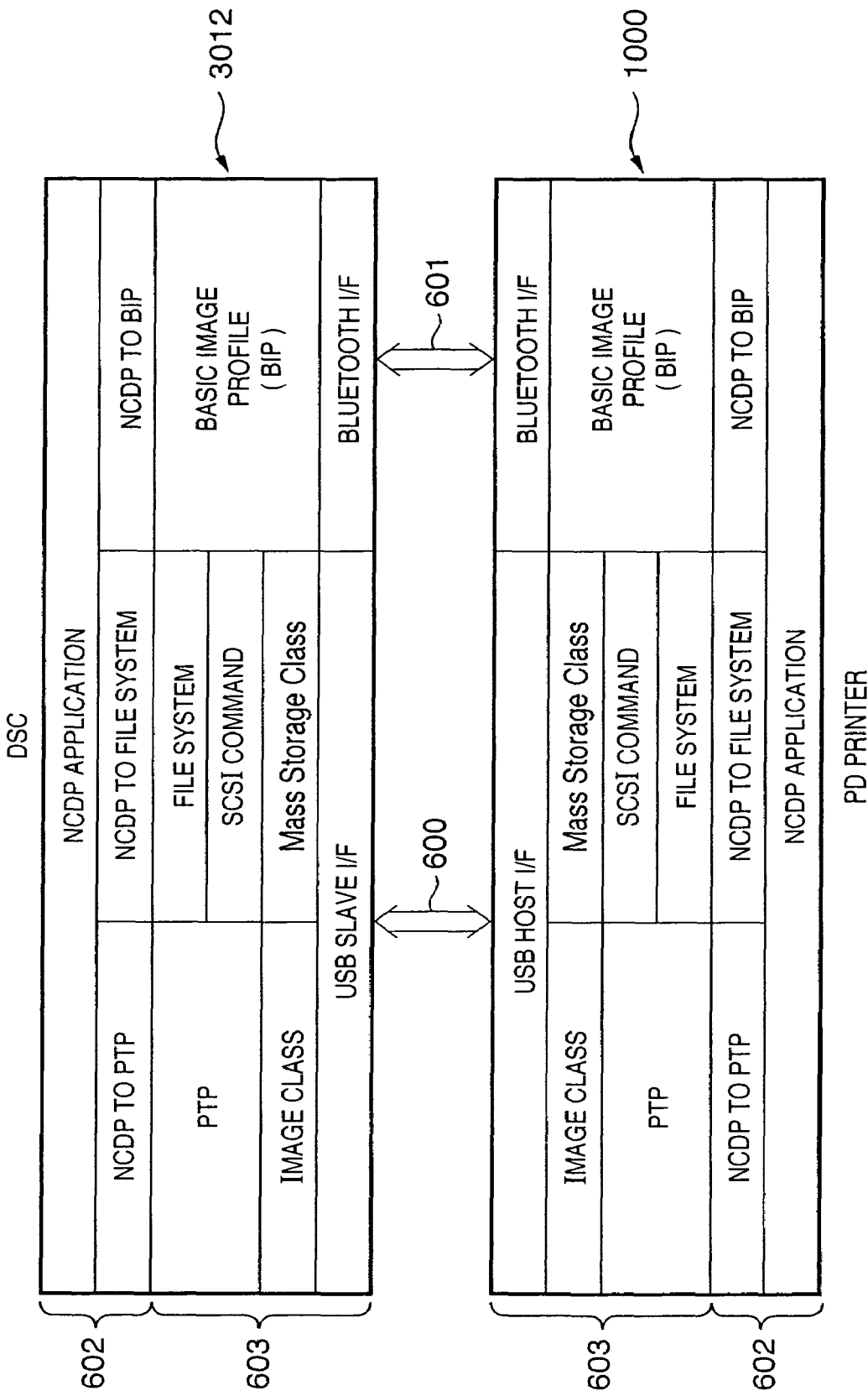

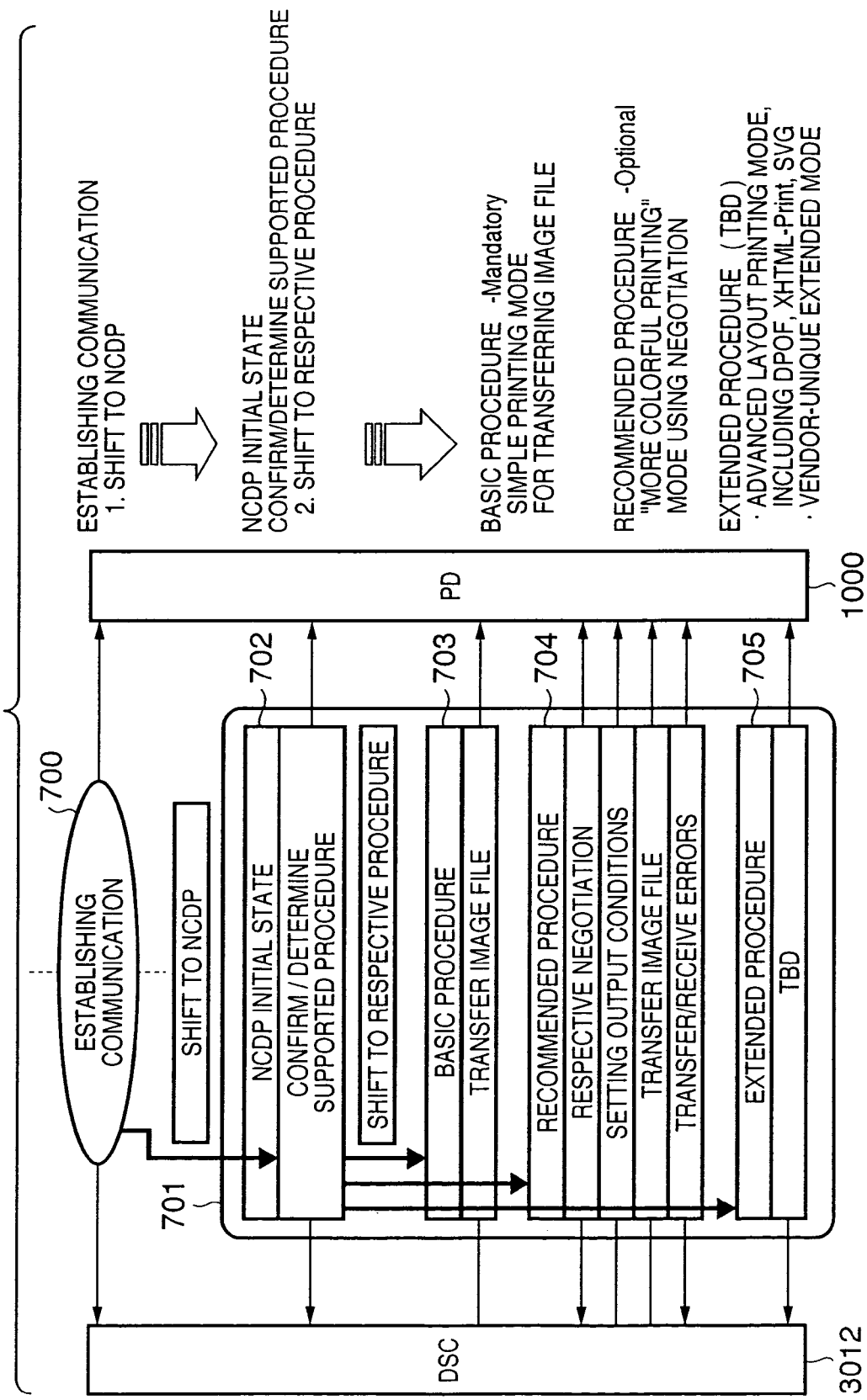

FIG. 8

| COMMAND SENDER | FUNCTION NAME | MODE | | | FUNCTION |
|---|---|---|---|---|---|
| | | BASIC | RECOMMENDED | EXTENDED | |
| PRINTER | NCDPStart | ○ | ○ | ○ | SHIFT TO NCDP |
| | ProcedureStart | ○ | ○ | ○ | SHIFT TO RESPECTIVE MODES (BASIC, RECOMMENDED, EXTENDED) |
| | NCDPEnd | ○ | ○ | ○ | TERMINATE NCDP |
| | Capability | | ○ | | NOTIFY PRINTER FUNCTION (WHEN NEGOTIATION IS NECESSARY) |
| | GetImage | ○ | ○ | | ACQUIRE IMAGE, e.g., JPEG, FROM DSC |
| | StatusSend | | ○ | | NOTIFY ERROR STATE (WARNING OR FATAL ERROR) |
| | PageStart | | ○ | | NOTIFY PRINT START (WHEN FEEDING IN PAPER UNIT) |
| | PageEnd | | ○ | | NOTIFY PRINT END (WHEN DISCHARGING IN PAPER UNIT) |
| | JobEnd | | ○ | | NOTIFY END OF PRINT JOB |
| DSC | JobStart | ○ | ○ | | COMMAND PRINTING |
| | JobAbort | | ○ | | COMMAND PRINTING CANCELLATION |
| | JobContinue | | ○ | | COMMAND PRINTING RESUME |

IMAGE INPUT APPARATUS, UI CONTROL METHOD THEREOF, AND IMAGE OUTPUT APPARATUS

FIELD OF THE INVENTION

The present invention relates to an image input apparatus (e.g., a digital camera) having a function for directly transmitting a digital image to an image output apparatus (e.g., a printer), a user interface (UI) control method of the image input apparatus, and the image output apparatus.

BACKGROUND OF THE INVENTION

Recently, a system called a photo-direct printing system has been proposed. In this system, a digital camera and a printer are directly connected by a cable, and digital images in the digital camera are transmitted to the printer through the cable, and printed.

However, the conventional photo-direct printing system proposes neither a function for informing the digital camera of the type of trimming print method that can be processed by a printer, nor a digital camera which has a function for providing a user interface appropriate for the trimming print method that can be processed by a printer.

SUMMARY OF THE INVENTION

The present invention has been proposed to solve the conventional problems, and has a feature to provide an image input which has a user interface (UI) corresponding to an image output function possessed by an image output apparatus, and a UI control method of the image input apparatus.

According to the present invention, there is provided an image input apparatus having a function for directly transmitting a digital image to an image output apparatus, comprising: obtaining means for obtaining from the image output apparatus, data related to an image outputting function of the image output apparatus; and UI changing means for changing contents of user interface displayed on a display device based on the data obtained by the obtaining means.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 depicts a protocol stack of a New Camera Direct Printing (NCDP) system incorporated in the PD printer and digital camera according to the present embodiment;

FIG. 7 depicts an explanatory view of a communication procedure in the NCDP system;

FIG. 8 depicts a table explaining commands in the NCDP system;

DETAILED DESCRIPTION OF THE PREFERRED EMBODIMENT

Hereinafter, the preferred embodiment of the present invention is described in accordance with the accompanying drawings.

Figure 1:
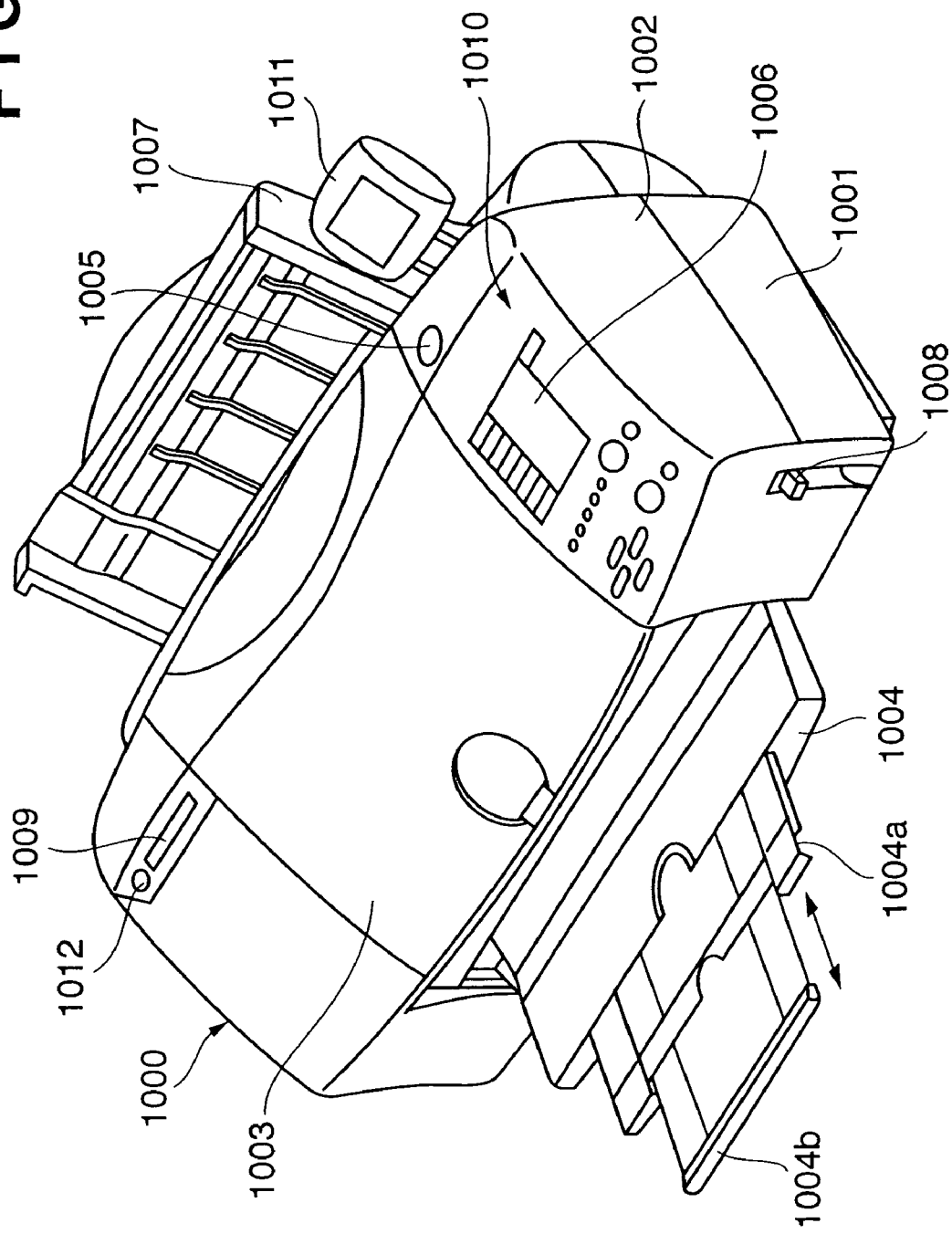
FIG. 1 depicts a perspective view showing an overview of a photo-direct (PD) printer according to an embodiment of the present invention.

FIG. 1 depicts a perspective view showing an overview of a photo-direct printer 1000 (hereinafter referred to as a PD printer) incorporating a New Camera Direct Printing (NCDP) system which serves as a direct printing system according to the present embodiment. The PD printer 1000 has a function as a regular PC printer for receiving and printing data from a host computer (PC), and a function for directly reading a digital image stored in a storage medium, e.g., a memory card, or receiving a digital image from a digital camera and printing.

Referring to FIG. 1, the main unit that constitutes the outer shell of the PD printer 1000 according to the embodiment comprises outer packing members including: a bottom case 1001, a top case 1002, an access cover 1003, and a discharge tray 1004. The bottom case 1001 constitutes substantially the lower half of the PD printer 1000, and the top case 1002 constitutes substantially the upper half of the main unit. Combining the top and bottom cases constructs a hollow structure including a housing space for housing respective mechanisms inside the case, which will be described below. The upper surface and front surface of these cases have opening portions. One end of the discharge tray 1004 is held rotatably by the bottom case 1001. By rotating the discharge tray 1004, the opening portion formed at the front surface of the bottom case 1001 can be opened or closed. When a printing operation is to be performed, the discharge tray 1004 is rotated toward the front to expose the opening portion. From this opening portion, a paper sheet can be discharged, and discharged paper sheets can sequentially be stacked. The discharge tray 1004 houses two auxiliary trays 1004a and 1004b. By sliding these trays toward the front as necessary, the paper supporting area can be enlarged or reduced in three levels.

One end of the access cover 1003 is rotatably held by the top case 1002, thereby enabling opening or closing of the opening portion formed on the upper surface of the case. By opening the access cover 1003, it is possible to exchange a printhead cartridge (not shown) or an ink tank (not shown) housed inside the printer main unit. Note, although not shown in the drawing, when the access cover 1003 is opened or closed, a projection formed on the back surface of the access cover 1003 rotates a cover open/close lever. By detecting the rotation position of the lever by a micro-switch or the like, it is possible to detect an open/close state of the access cover 1003.

Furthermore, a power source key 1005 is provided on the upper surface of the top case 1002. On the right side of the top case 1002, an operation panel 1010 including a liquid crystal display portion 1006, various switches and the like, are provided. The configuration of the operation panel 1010 will be described later in detail with reference to FIG. 2. Numeral 1007 denotes an automatic paper feeding unit which automatically feeds a paper sheet into the printer main unit. Numeral 1008 denotes a paper space selection lever, which adjusts a space between the printhead and a paper sheet. Numeral 1009 denotes a card slot, into which an adapter including a memory card is slotted. Digital images stored in the memory card can directly be read and printed through this adapter. For the memory card (PC), for instance, a compact flash (registered trademark) memory card, a smart medium, a memory stick or the like may be used. Numeral 1011 denotes a viewer (liquid crystal display unit) which is attachable/detachable to/from the main unit of the PD printer 1000. In a case of searching for an image to be printed from images stored in the PC card, an image of each frame or index images are displayed on the viewer. Numeral 1012 denotes a USB terminal for connecting the PD printer 1000 with a digital camera which will be described later. On the back surface of the PD printer 1000, a USB connector is provided for connecting a personal computer (PC).

Figure 2:
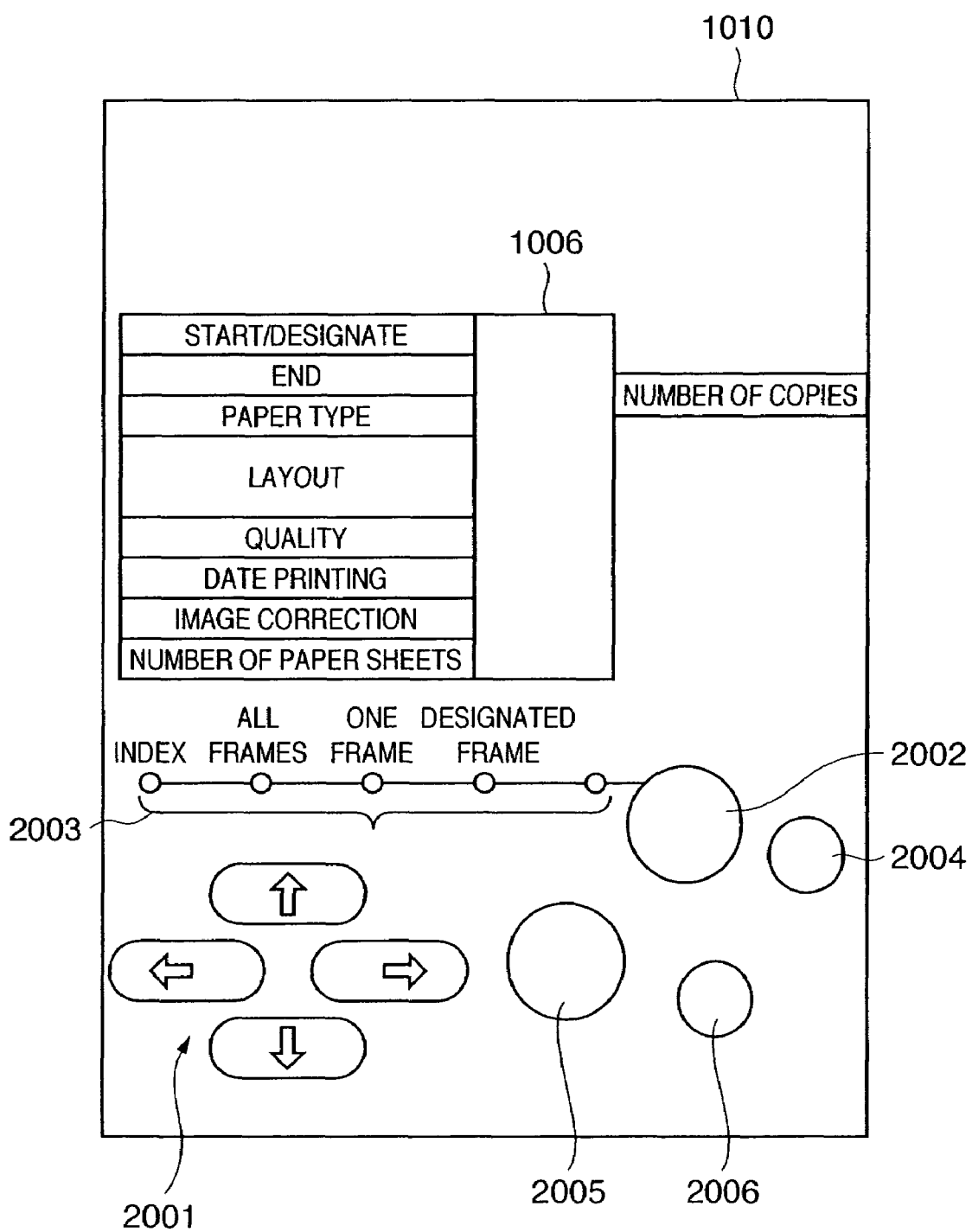
FIG. 2 depicts an overview of an operation panel of the PD printer according to the present embodiment.

FIG. 2 depicts an overview of the operation panel 1010 of the PD printer 1000 according to the present embodiment.

The liquid crystal display unit 1006 displays menu items for performing various data setting related to the items printed on the left and right of the display unit 1006. The menu items include, e.g., an item indicating the first frame number of photographs to be printed or a designated frame number of photograph to be printed (START/DESIGNATE), an item indicating the last frame number of photos to be printed (END), an item indicating the number of copies to be printed (COPY COUNT), an item indicating the type of paper sheet to be used in printing (PAPER TYPE), an item indicating the number of photographs to be printed in one paper sheet (LAYOUT), an item indicating a print quality (QUALITY), an item indicating whether or not to print a photographing date (DATE PRINT), an item indicating whether or not to print a photo after correction (IMAGE CORRECTION), an item indicating the number of paper sheets required for printing (PAPER COUNT), and the like. The items are selected or designated by using cursor keys 2001. Numeral 2002 denotes a mode key. Each time the key 2002 is depressed, the type of printing (INDEX, ALL FRAMES, ONE FRAME, and the like) can be switched. In accordance with the type of printing, the corresponding LED 2003 is lit. Numeral 2004 denotes a maintenance key for performing printer maintenance, e.g., cleaning of the printhead. Numeral 2005 denotes a print start key, which is depressed to designate print start or to execute maintenance setting. Numeral 2006 denotes a print cancel key, which is depressed to cancel printing or to designate maintenance cancellation.

Next, a configuration of the main part of the PD printer 1000 related to controlling the printer according to this embodiment is described with reference to FIG. 3. Note that in FIG. 3, with respect to components common to those described in the aforementioned drawings, the same numerals are assigned, and descriptions thereof are omitted.

Figure 3:
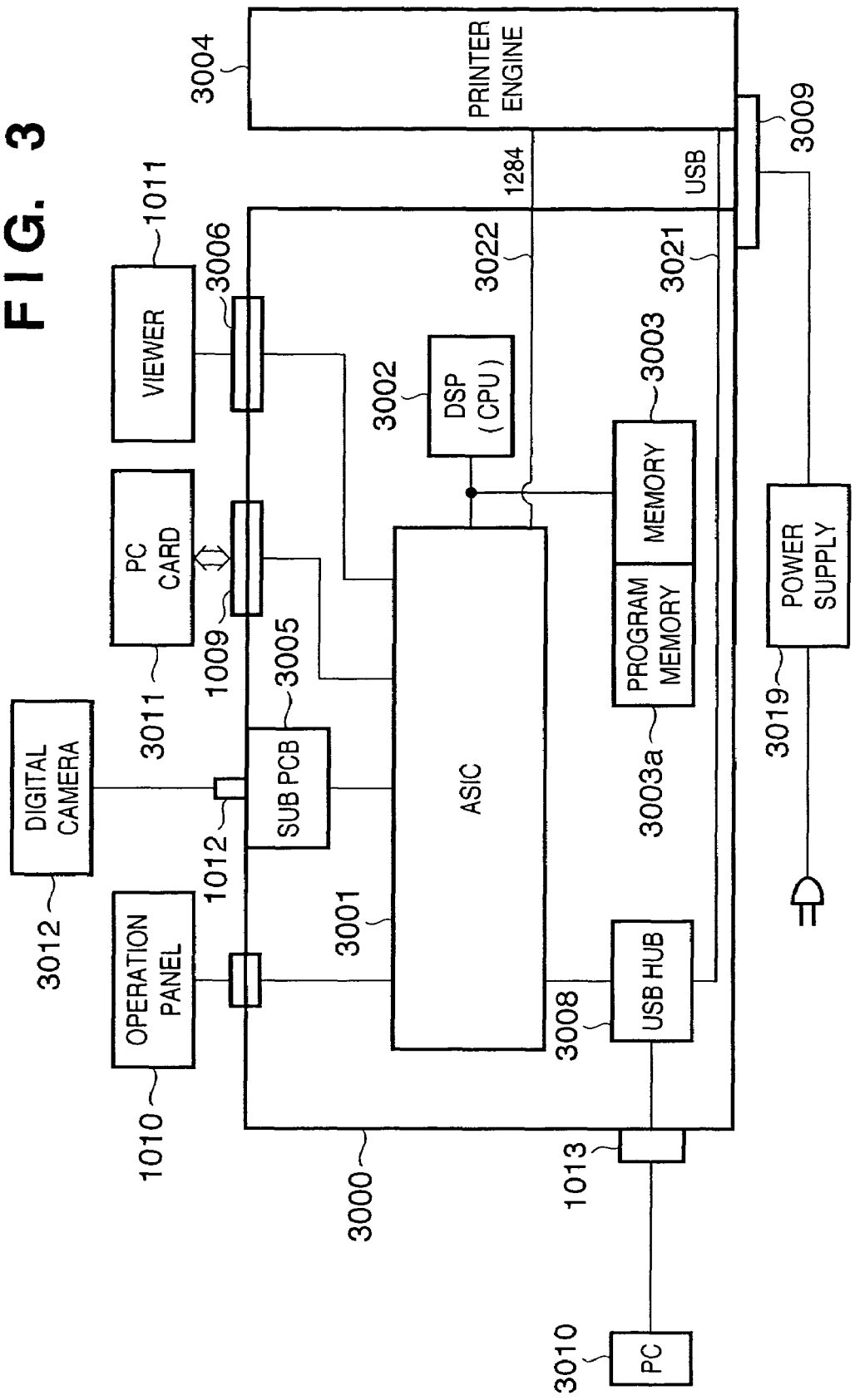
FIG. 3 is a block diagram showing a configuration of the main part of the PD printer related to controlling the printer according to the present embodiment.

Referring to FIG. 3, numeral 3000 denotes a control unit (control substrate). Numeral 3001 denotes an ASIC (exclusive-use custom LSI). The configuration of the ASIC will be described later in detail with reference to the block diagram in FIG. 4. Numeral 3002 denotes a DSP (digital signal processor) internally including a CPU for performing various controlling (to be described later) and image processing, e.g., conversion from luminance signals (R, G, and B) to density signals (C, M, Y and K), scaling, gamma conversion, error diffusion, and the like. Numeral 3003 denotes a memory including: a program memory 3003*a* for storing a control program of the CPU of the DSP 3002, a RAM area for storing a program being executed, and a memory area serving as a work memory for storing digital images or the like. Numeral 3004 denotes a printer engine. This embodiment employs a printer engine for an inkjet printer, which prints color images by using plural color ink. Numeral 3005 denotes a USB connector serving as a port for connecting a digital camera 3012. Numeral 3006 denotes a connector for connecting the viewer 1011. Numeral 3008 denotes a USB hub. When the PD printer 1000 performs printing based on a digital image transferred from a PC 3010, the data from the PC 3010 is transferred through the hub 3008 and outputted to the printer engine 3004 via a universal serial bus (USB) 3021. Therefore, the PC 3010 connected to the PD printer 1000 can directly transfer data and signals to the printer engine 3004 and perform print execution (i.e., it can function as a general PC printer). Numeral 3009 denotes a power supply connector, to which DC voltage converted from commercial AC is inputted from a power supply 3019. The PC 3010 is a general personal computer. Numeral 3011 denotes an aforementioned memory card (PC card); and 3012 denotes a digital camera.

Note that the control unit 3000 and printer engine 3004 exchange signals through the aforementioned USB 3021, or an IEEE1284 bus 3022.

Next, the configuration of the ASIC 3001 is described with reference to FIG. 4.

Figure 4:
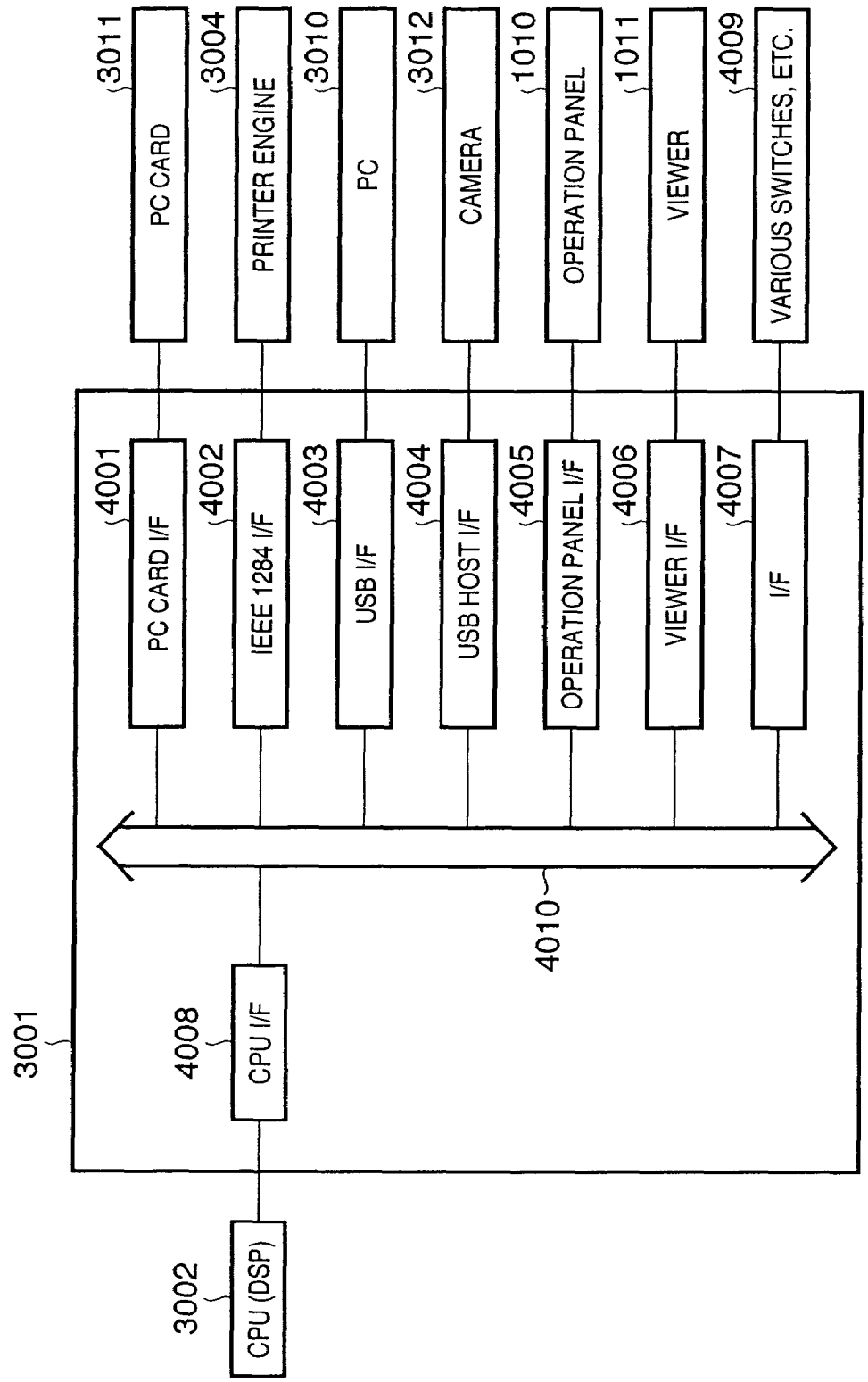
FIG. 4 is a block diagram showing a configuration of an ASIC (application specific integrated circuit) of the PD printer according to the present embodiment.

Referring to FIG. 4, numeral 4001 denotes a PC card interface unit, which reads a digital image stored in a PC card 3011, or writes data in the PC card 3011. Numeral 4002 denotes an IEEE1284 interface unit, which exchanges data with the printer engine 3004. The IEEE 1284 interface unit 4002 is a bus used in a case of printing a digital image stored in the digital camera 3012 or PC card 3011. Numeral 4003 denotes a USB interface unit, which exchanges data with the PC 3010. Numeral 4004 denotes a USB host interface unit, which exchanges data with the digital camera 3012. Numeral 4005 denotes an operation panel interface unit, which performs inputting of various operation signals from the operation panel 1010 or performs outputting of display data to the display unit 1006. Numeral 4006 denotes a viewer interface unit, which controls displaying of a digital image on the viewer 1011. Numeral 4007 denotes an interface unit for controlling an interface between various switches and the LED 4009 or the like. Numeral 4008 denotes a CPU interface unit, which controls data exchange with the DSP 3002. Numeral 4010 denotes an internal bus (ASIC bus) for connecting the aforementioned components.

Figure 11:
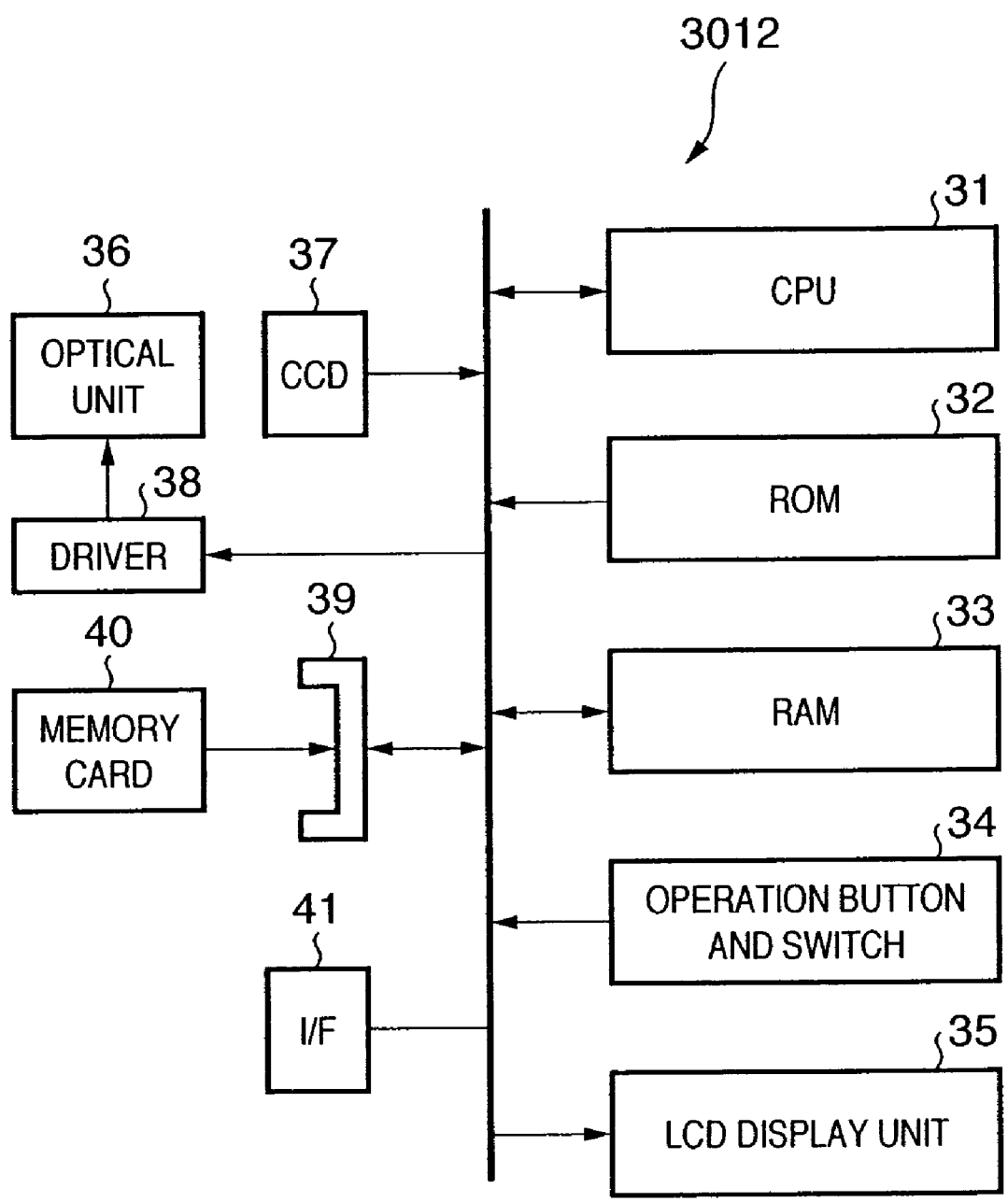
FIG. 11 is a block diagram showing a configuration of the digital camera according to the present embodiment.

FIG. 11 is a block diagram showing a configuration of the digital camera 3012 incorporating the NCDP system, which serves as a direct printing system according to the present embodiment, and a user interface of the system.

Referring to FIG. 11, numeral 31 denotes a CPU for controlling an operation of the digital camera 3012. Numeral 32 denotes ROM storing a processing procedure (firmware) of the CPU 31 (Note, assuming that the firmware is updated ad libitum, writable non-volatile memory, such as flash memory is employed). Numeral 33 denotes RAM, which is used as a work area of the CPU 31. Numeral 34 denotes an operation unit including switches for performing various operation. Numeral 35 denotes a liquid crystal display unit, which is used for confirming an image to be sensed or displaying a menu for performing various setting. In a case where the present embodiment functions as a direct printing system, the operation unit 34 and the display unit 35 serve as a user interface of the system. Numeral 36 denotes an optical unit, which is configured mainly with a lens and a driving system of the lens. Numeral 37 denotes a CCD. Numeral 38 denotes a driver for controlling the optical unit 36 under the controlling of the CPU 31. Numeral 39 denotes a connector for connecting a storage medium 40 (compact flash (registered trademark) memory card, smart medium, and so on). Numeral 41 denotes a USB interface (slave side of the USB) for connecting the digital camera 3012 with a PC or the PD printer 1000 according to this embodiment.

The PD printer 1000 and digital camera 3012 according to the present embodiment are configured in the foregoing manner. Hereinafter, a brief operation of the system having the above-described configuration is described.

<Regular PC Printer Mode>

This is a printing mode for printing images based on print data transmitted from the PC 3010.

In this mode, when data from the PC 3010 is inputted to the USB connector 1013 (FIG. 3), the data is directly transmitted to the printer engine 3004 through the USB hub 3008 and the USB 3021, then printing is performed based on the data from the PC 3010.

<Direct Printing Mode from PC Card>

When the PC card 3011 is inserted to or removed from the card slot 1009, an interruption occurs. By this, the DSP 3002 can detect whether or not the PC card 3011 is inserted or removed. When the PC card 3011 is inserted, a compressed digital image (e.g., compressed by JPEG method) stored in the PC card 3011 is read out and stored in the memory 3003. Then, the compressed digital image is decompressed, and stored again in the memory 3003. When printing of the stored digital image is designated from the operation panel 1010, the data is converted to print data printable by the printer engine 3004 by executing, e.g., conversion from R, G, and B signals to Y, M, C, and K signals, gamma conversion, error diffusion and the like. The print data is outputted to the printer engine 3004 through the IEEE 1284 interface unit 4002, and printed.

<Direct Printing Mode from Camera>

Figure 5:
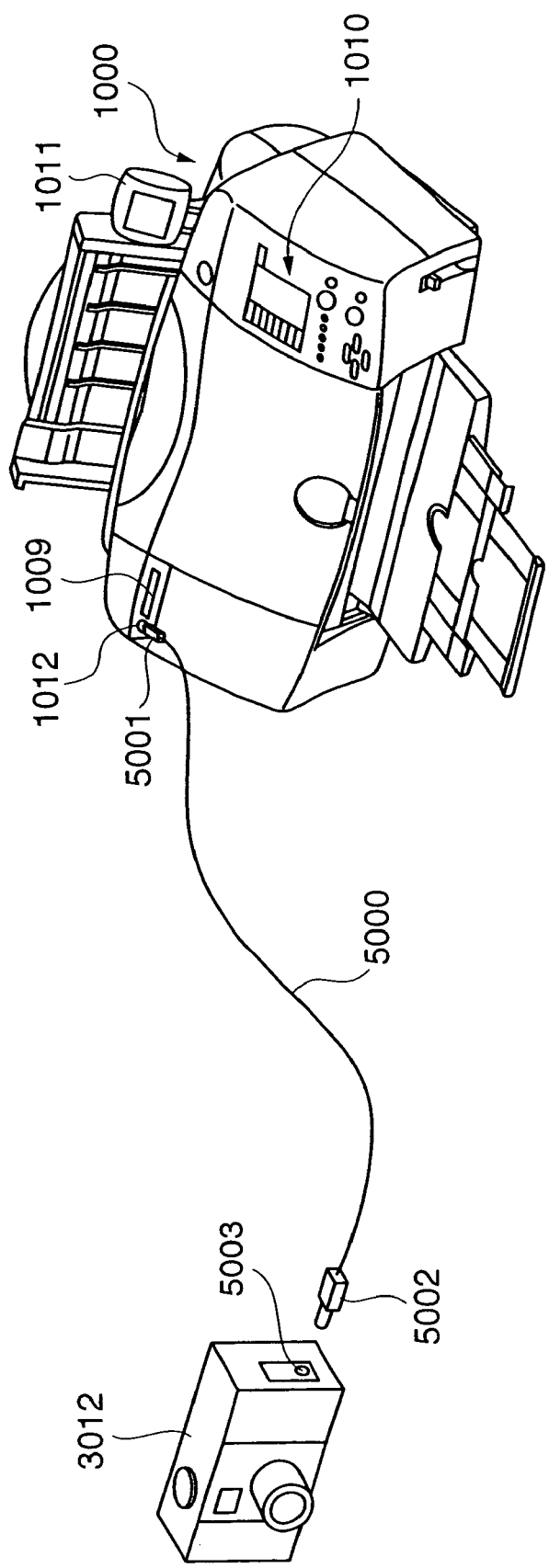
FIG. 5 depicts a view showing a state in which the PD printer and digital camera according to the present embodiment are connected.

FIG. 5 depicts a view showing a state in which the PD printer 1000 and digital camera 3012 according to the present embodiment are connected.

Referring to FIG. 5, a cable 5000 comprises: a connector 5001 to be connected with the connector 1012 of the PD printer 1000, and a connector 5002 to be connected with a connector 5003 of the digital camera 3012. The digital camera 3012 is capable of outputting a digital image, stored in the internal memory, through the connector 5003. Note that the digital camera 3012 may adopt various configurations, e.g., it may comprise an internal memory as storage means, or a slot for inserting a detachable memory. By connecting the digital camera 3012 with the PD printer 1000 via the cable 5000 shown in FIG. 5, digital images in the digital camera 3012 can directly be transmitted to the PD printer 1000 and printed.

When the digital camera 3012 is connected with the PD printer 1000 as shown in FIG. 5 and the operation mode is shifted to a direct printing mode as a result of negotiation, a camera mark is displayed on the display unit 1006 of the operation panel 1010. What is displayed or operated on the operation panel 1010 becomes invalid. What is displayed on the viewer 1011 also becomes invalid. Only the key operation on the digital camera 3012 and image display on the display unit (not shown) of the digital camera 3012 become valid, and a user designates printing by using the digital camera 3012. This can prevent errors caused by simultaneously operating the operation unit of the digital camera 3012 and the operation unit of the PD printer 1000.

FIG. 6 shows a protocol stack of the NCDP system incorporated in the PD printer 1000 and digital camera 3012 according to the present embodiment. Note that the NCDP system according to this embodiment does not depend upon the type of communication interface, as shown in FIG. 6.

Referring to FIG. 6, numeral 600 denotes an interface using a USB; and 601, an interface according to Bluetooth. Numeral 602 denotes an application layer incorporated at the time of constructing the NCDP system. Numeral 603 denotes a layer for executing an existing protocol and interface, and includes a PTP (Picture Transfer Protocol), a SCSI, a BIP (Basic Image Profile) of the Bluetooth, a USB interface, and the like. It is a condition for the NCDP system to have an architecture, such as the aforementioned protocol layers, and to have the system as an application program on top of the architecture. In this embodiment, the PD printer 1000 is prescribed as a USB host, and the camera 3012 is prescribed as a USB slave, and both have the same configuration as shown in FIG. 6.

Although details will be described later, the advantage of using the NCDP system is in that when the PD printer 1000 and the digital camera 3012 exchange information to each other upon being shifted to or after they are shifted to the NCDP system, a file (e.g., text file) having a series of information and a series of operation procedures described in a script is generated, then the file is transmitted from one to the other device, and the device which receives the file interprets and processes the received script. Therefore, when one device needs to transmit information constructed with plural elements to the other device, it is possible to reduce the data exchange of each element performed by handshakes. Accordingly, overheads caused by data transmission can be eliminated, and data transmission efficiency can be improved. For instance, assuming a case where a user selects a plurality of desired images to be printed in the digital camera 3012 and sets printing conditions to each of the plurality of desired images, a series of processing procedures of this operation can be described as a script and notified to the PD printer 1000. The PD printer 1000 can simply interpret and process the received script.

FIG. 7 depicts an explanatory view of a communication procedure between the PD printer 1000 and the digital camera 3012 in the NCDP system.

When it is detected that the PD printer 1000 and the digital camera 3012 are connected via the USB cable 5000 as shown in FIG. 5, these devices become communicatable (capable of communicating with each other). Application programs installed in these devices are executed, thereby starting a shift to the procedure 701 in the NCDP system. Numeral 702 denotes an initial state of the NCDP system. In this step, it is determined whether or not these devices are capable of executing the NCDP system. If YES, procedure 701 in the NCDP system progresses. If the digital camera 3012 does not have the NCDP system, communication control according to the NCDP system is not executed. Upon being shifted to the NCDP system, when the digital camera 3012 designates digital image transferring/printing in a "BASIC PROCEDURE" as indicated by numeral 703, the PD printer 1000 is shifted to a "simple printing mode" in which an image file is transferred from the digital camera 3012 to the PD printer 1000 for printing. Furthermore, when the digital camera 3012 designates digital image transferring/printing in a "RECOM- MENDED PROCEDURE" as indicated by numeral 704, various negotiations are performed between the digital camera 3012 and the PD printer 1000 to determine printing conditions or the like, and the PD printer 1000 is shifted to a more colorful printing mode than the case of transferring the image file from the digital camera 3012 to the PD printer 1000. Furthermore, when the digital camera 3012 designates an "EXTENDED PROCEDURE" as indicated by numeral 705, the PD printer 1000 is set in a printing mode which performs printing with advanced layout functions, e.g., DPOF, XHTML-print, SVG, and so on, and vendor-unique specifications. Note since the detailed specification of the "EXTENDED PROCEDURE" is defined by respective extended specifications of respective digital camera manufacturers, descriptions thereof are not provided herein. The printing in the "BASIC PROCEDURE" and "RECOMMENDED PROCEDURE" will be described later with reference to FIGS. 9 to 10.

FIG. 8 depicts a table explaining commands defined in the NCDP system.

In FIG. 8, "mode" corresponds to the aforementioned "BASIC PROCEDURE," "RECOMMENDED PROCEDURE," and "EXTENDED PROCEDURE" designated by the digital camera 3012. In the "RECOMMENDED PROCEDURE," all commands can be used, whereas in the "BASIC PROCEDURE" which is a simple printing mode, commands for shifting to or terminating the NCDP system, a command for shifting to the respective modes ("BASIC PROCEDURE," "RECOMMENDED PROCEDURE," "EXTENDED PROCEDURE"), a command for obtaining digital images from the camera 3012, and a printing command from the camera 3012 only are used. Note in the "EXTENDED PROCEDURE," although the table in FIG. 8 shows that the commands for shifting to or terminating the NCDP system and the command for shifting to the respective modes only are used, other commands may be used in accordance with specifications of respective manufacturers as mentioned above.

Figure 9:
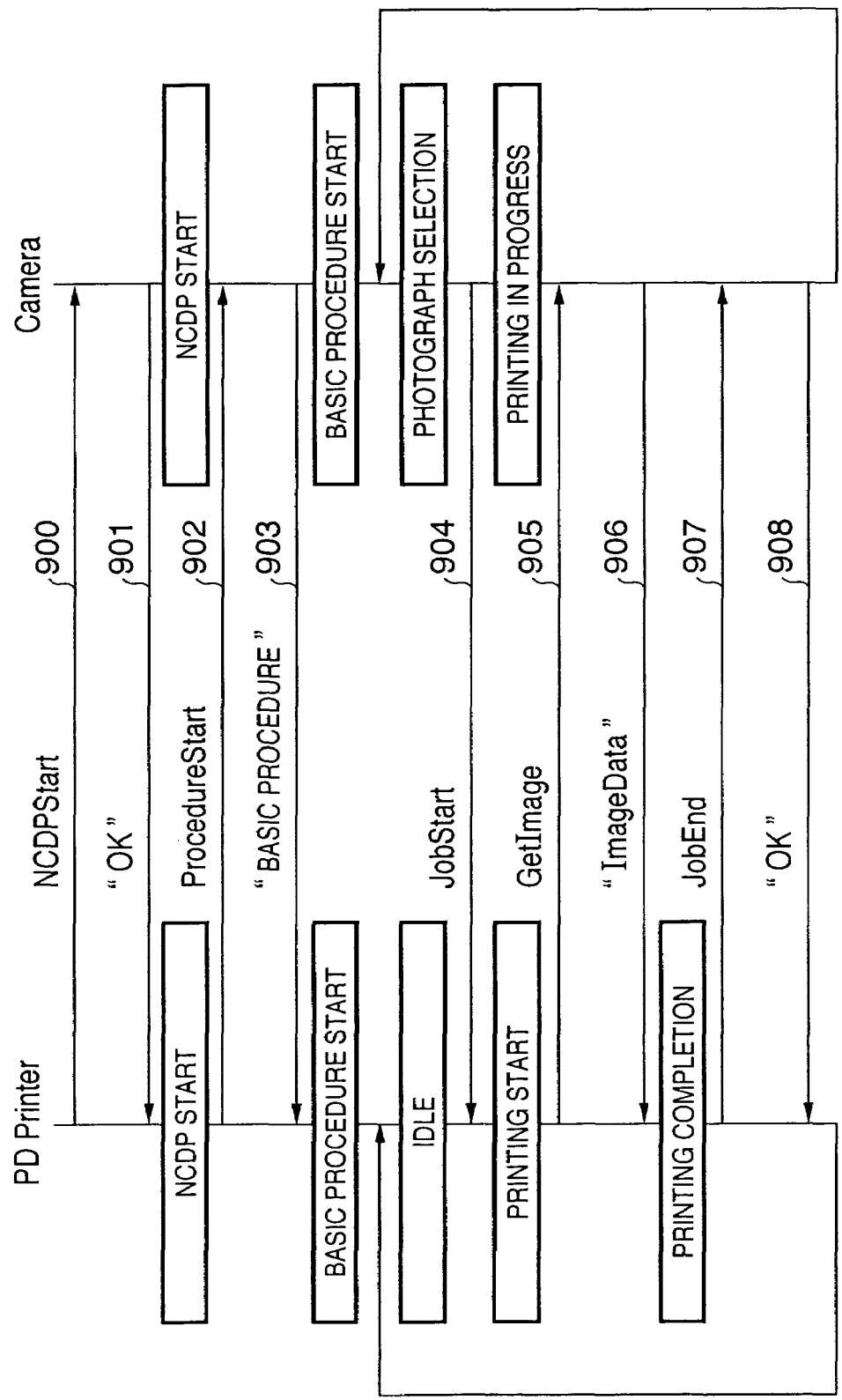
FIG. 9 depicts an explanatory view of a printing procedure according to a "BASIC PROCEDURE" of the NCDP system.

FIG. 9 depicts an explanatory view of a printing procedure according to the "BASIC PROCEDURE" of the NCDP system. The "BASIC PROCEDURE" is a simple printing mode in which one image file is transferred from the digital camera 3012 to the PD printer 1000 for printing. The image format supported by the PD printer 1000 includes: an RGB image having a VGA size (640.times.480 pixels) or a JPEG image having a VGA size (640.times.480 pixels). The digital camera 3012 transfers images in the format supported by the PD printer 1000. In this case, error handling is not executed.

First, as indicated by numeral 900, the PD printer 1000 transfers a command (NCDPStart) to the digital camera 3012 for designating a shift to the NCDP system. If the digital camera 3012 has the NCDP system, an OK is returned (901).

After the PD printer 1000 and the camera 3012 confirm that they both have the NCDP system, the PD printer 1000 transmits a command (ProcedureStart) to the digital camera 3012 for shifting to the printing mode (902). In response, the digital camera 3012 transmits the "BASIC PROCEDURE" which is a simple printing mode (903), thereafter the PD printer 1000 is shifted to the printing mode according to the "BASIC PROCEDURE." When an image to be printed is selected and print start is designated by an operation of the digital camera 3012, a command (JobStart) designating a print start is transferred from the digital camera 3012 to the PD Printer 1000 (904). By this, the PD printer 1000 is shifted to the simple printing mode, and transmits a command (GetImage) to the digital camera 3012 to request a digital image (905). In response, the digital camera 3012 transmits a digital image to the PD printer 1000 (906), and the PD printer 1000 starts printing process. When printing of the designated image is completed, a command (JobEnd) indicative of an end of the printing job is transmitted from the PD printer 1000 to the digital camera 3012 (907). When an affirmative response (OK) is returned from the digital camera 3012 (908), the printing process according to the "BASIC PROCEDURE" ends.

As described above, designating a printing mode from the camera 3012 is equivalent to designating a printing mode from an apparatus that designates a printing operation. Therefore, a user of the camera 3012 can designate a desired printing mode.

Figure 10:
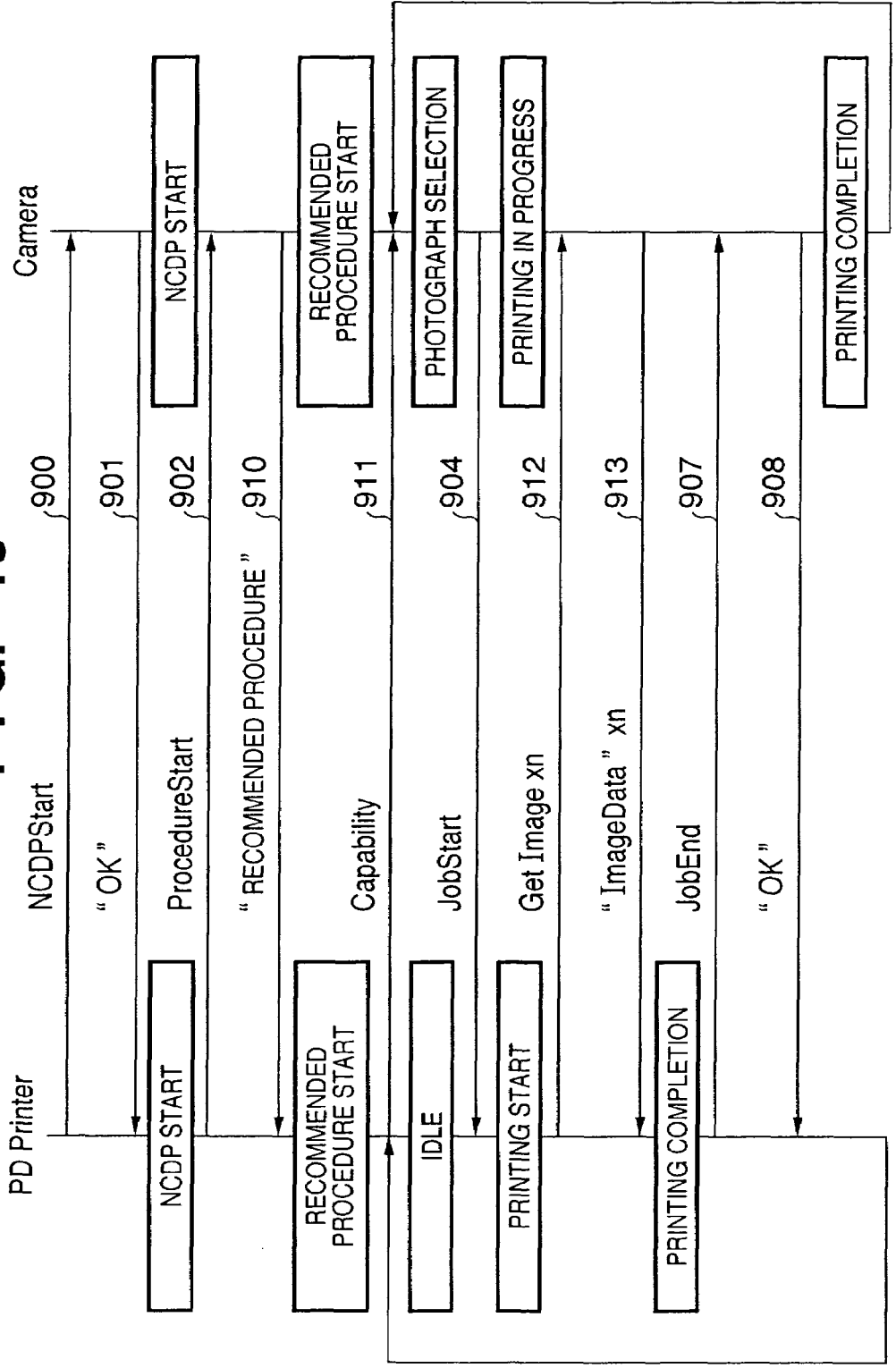
FIG. 10 depicts an explanatory view of a printing procedure according to a "RECOMMENDED PROCEDURE" of the NCDP system.

FIG. 10 depicts an explanatory view of a printing procedure according to a "RECOMMENDED PROCEDURE" of the NCDP system. Note in FIG. 10, with respect to steps common to those described in FIG. 9, the same step numerals are assigned, and descriptions thereof are omitted. In the "RECOMMENDED PROCEDURE," a "more colorful printing" mode can be set as a result of a negotiation between the PD printer 1000 and the digital camera 3012, and plural numbers of photograph printing and layout printing become possible. Furthermore, error handling is executable.

Referring to FIG. 10, after the PD printer 1000 and the camera 3012 confirm that they both have the NCDP system as similar to FIG. 9, the digital camera 3012 designates the "RECOMMENDED PROCEDURE" (910). First, the PD printer 1000 generates capability data, including information related to the functions possessed by the PD printer 1000, and transmits the capability data to the digital camera 3012 (911). The capability data includes: information regarding the type and size of paper sheet handled by-the PD printer 1000, information regarding printing quality, information regarding an image format that can be processed by the PD Printer 1000, capability/incapability of date printing, capability/incapability of file name printing, information regarding a print layout that can be processed by the PD printer 1000, existence/non-existence of edgeless printing function, capability/incapability of image correction, and so on. Furthermore, the capability data also includes: information regarding the type of trimming print method that can be processed by the PD printer 1000, and information regarding a shape of a printing range and a trimming size that can be set in the trimming print. In this embodiment, the capability data is described in XML (Extensible Markup Language) for improved extensibility and interchangeability.

The digital camera 3012, which has received the capability data of the PD printer 1000, can determine which function of the PD printer 1000 is to be used in printing. The digital camera 3012 provides a user with a menu corresponding to the received capability data, by displaying it on the display unit 35 serving as a UI screen. The user can select an image to be printed by operating the operation button 34. The user can also select and designate an image printing condition from the functions (printing conditions) possessed by the PD printer 1000, which are displayed on the UI. When an image to be printed and printing condition thereof are determined and print start is designated, a print command (JobStart) is transmitted to the PD printer 1000. In response, the PD printer 1000 transmits a command (GetImage xn) requesting the digital image (912). In response, the digital camera 3012 transmits the digital image in a format receivable by the PD printer 1000 (Tiff, JPEG, RGB and so on) (913).

By virtue of the "xn" included in the command (GetImage xn), plural (herein, n) digital images can be transmitted, in contrast to one image. For instance, in a case where 2.times.2 layout printing is designated, it is necessary to transmit four pieces of digital images for one sheet of paper. When printing of the designated images is completed, a command (JobEnd) indicative of an end of the printing job is transmitted from the PD printer 1000 to the digital camera 3012 (907). When an affirmative response (OK) is returned from the digital camera 3012 (908), the control shifts to the next image selection/printing process in the "RECOMMENDED PROCEDURE."

Figure 12:
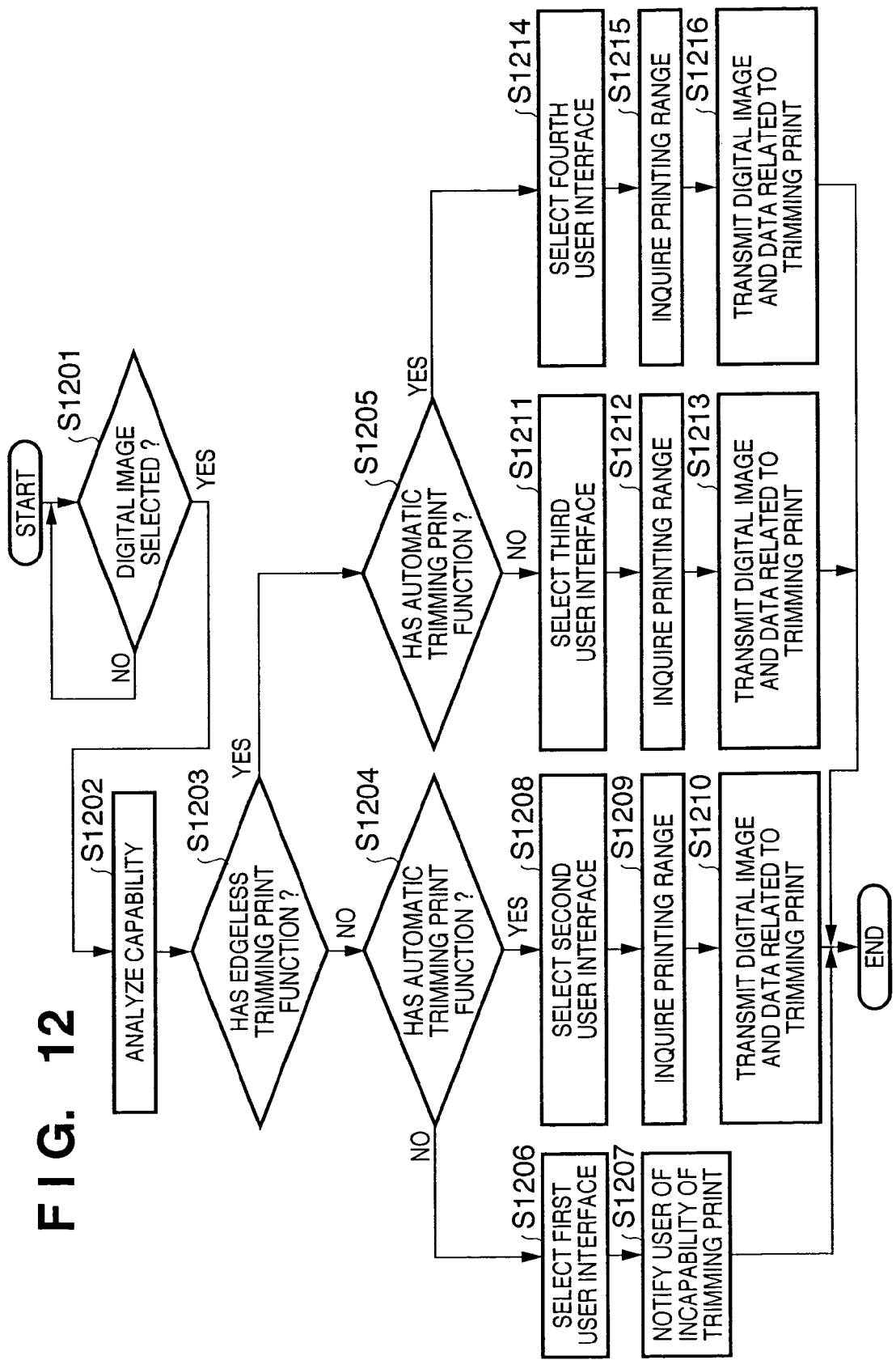
FIG. 12 is a flowchart describing a trimming print procedure in the NCDP system according to the present embodiment.

Next, steps of changing the user interface of the digital camera 3012 in accordance with the type of trimming print method that can be processed by the PD printer 1000 are described with reference to FIG. 12. Note these steps are controlled by the CPU 31 of the digital camera 3012.

In step S1201, it is determined whether or not a user has selected a digital image to be trimming-printed. When the user selects a digital image to be trimming-printed, the control proceeds to step S1202, where the capability data of the PD printer 1000 is analyzed, and the type of trimming print method that can be processed by the PD printer 1000 is detected. The capability data can be received in the "RECOMMENDED PROCEDURE" of the NCDP system. In step S1203, it is determined whether or not the PD printer 1000 has an "edgeless trimming print" function, which is one of the trimming print methods. The "edgeless trimming print" function, which is also hereinafter referred to as a "first trimming print function", is to enlarge or reduce a digital image of a printing range, which is set by the digital camera 3012, and print the image in the entire surface of the paper sheet without a margin. Note, assume that the shape of a printing range that can be set in the "edgeless trimming print" corresponds to an aspect ratio of paper sheet, and the size thereof is variable. If the PD printer 1000 has the "edgeless trimming print" function, the control proceeds to step S1205; otherwise, the control proceeds to step S1204.

In step S1204, it is determined whether or not the PD printer 1000 has an "automatic trimming print" function, which is another of the trimming print methods. The "automatic trimming print" function, which is also hereinafter referred to as a "second trimming print function", is to print the digital image of a printing range, which is set by the digital camera 3012, in the size and shape automatically determined by the PD printer 1000. Note that the image of the printing range set by the digital camera 3012 is always printed. The printing range that can be set in the "automatic trimming print" function represents a minimum range desired by a user. The shape of the printing range may be of a rectangle, a square, a circle, an oval, a heart, and so forth, and the size thereof is variable.

If it is determined in step S1204 that the PD printer 1000 does not have the "edgeless trimming print" function or the "automatic trimming print" function, the control proceeds to step S1206, where the first user interface is selected and a message is displayed on the display unit 35 (S1207). On the first user interface, neither printing by the "edgeless trimming print" nor the "automatic trimming print" is operable.

In the foregoing manner, the user is informed through the first user interface of the digital camera 3012 of the fact that printing by the automatic trimming function cannot be performed.

Meanwhile, in step S1204, if it is determined that the PD printer 1000 does not have the "edgeless trimming print" function but has the "automatic trimming print" function, the control proceeds to step S1208, where the second user interface is selected and a message is displayed on the display unit 35. On the second user interface, printing by the "automatic trimming print" is operable. In step S1209, the capability of the "automatic trimming print" is notified to the user through the second user interface of the digital camera 3012, and a printing range is inquired to the user. In response, the user operates the second user interface using the operation unit 34, and sets the position, size, and shape of the printing range. In step S1210, the digital camera 3012 transmits the digital image and information regarding the trimming print to the PD printer 1000. The information regarding the trimming print includes information regarding a printing range (including the position, size, and shape of the printing range set by the user).

The PD printer 1000 extracts the digital image in the printing range in accordance with the information regarding the printing range, enlarges or reduces the extracted digital image to a size automatically determined by the PD Printer 1000, and prints the enlarged or reduced digital image on paper sheet. In the above-described manner, printing by the "automatic trimming print" is performed.

Meanwhile, in step S1203, if it is determined that the PD printer 1000 has the "edgeless trimming print" function which is one of the trimming print method, the control proceeds to step S1205. Then, it is determined whether or not the PD printer 1000 has the "automatic trimming print" function as similar to step S1204. If NO, the control proceeds to step S1211, where the third user interface is selected and a message is displayed on the display unit 35. On the third user interface, printing by the "edgeless trimming print" is operable.

In step S1212, the capability of the "edgeless trimming print" is notified to the user through the third user interface of the digital camera 3012, and a printing range is inquired to the user. In response, the user operates the third user interface using the operation unit 34, and sets the position and size of the printing range. The shape of the printing range is automatically determined in accordance with the paper sheet. In step S1213, the digital camera 3012 transmits the digital image and information regarding the trimming print to the PD printer 1000. The information regarding the trimming print includes information regarding a printing range (including the position and size of the printing range set by the user).

The PD printer 1000 extracts the digital image in the printing range in accordance with the information regarding the printing range, enlarges or reduces the extracted digital image to a size appropriate for the paper sheet, and prints the enlarged or reduced digital image on the entire surface of the paper sheet. In the above-described manner, printing by the "edgeless trimming print" is performed.

Meanwhile, in step S1205, if it is determined that the PD printer 1000 has the "automatic trimming print" function, the control proceeds to step S1214, where the fourth user interface is selected and a message is displayed on the display unit 35. On the fourth user interface, printing by the "edgeless trimming print" and the "automatic trimming print" is operable. In step S1215, the capability of the "edgeless trimming print" and "automatic trimming print" is notified to the user through the fourth user interface of the digital camera 3012, and a printing range is inquired to the user. In response, the user operates the fourth user interface using the operation unit 34, and selects the "edgeless trimming print" or the "automatic trimming print." When the user selects the "edgeless trimming print," the user sets the position and size of the printing range using the operation unit 34. When the user selects the "automatic trimming print," the user sets the position, size, and shape of the printing range using the operation unit 34. In step S1216, the digital camera 3012 transmits the digital image and information regarding the trimming print to the PD printer 1000. The information regarding the trimming print includes information indicative of the type of trimming print method (in this embodiment, the "edgeless trimming print" or "automatic trimming print"), and information regarding a printing range (including the position, size, and shape of the printing range set by the user).

In the "automatic trimming print," the PD printer 1000 extracts the digital image in the printing range in accordance with the information regarding the printing range, enlarges or reduces the extracted digital image to a size automatically determined by the PD Printer 1000, and prints the enlarged or reduced digital image on paper sheet, thereby achieving printing according to the "automatic trimming print."

Meanwhile, in the "edgeless trimming print," the PD printer 1000 extracts the digital image in the printing range in accordance with the information regarding the printing range, enlarges or reduces the extracted digital image to a size appropriate for the paper sheet, and prints the enlarged or reduced digital image on the entire surface of the paper sheet, thereby achieving printing according to the "edgeless trimming print."

Figure 13:
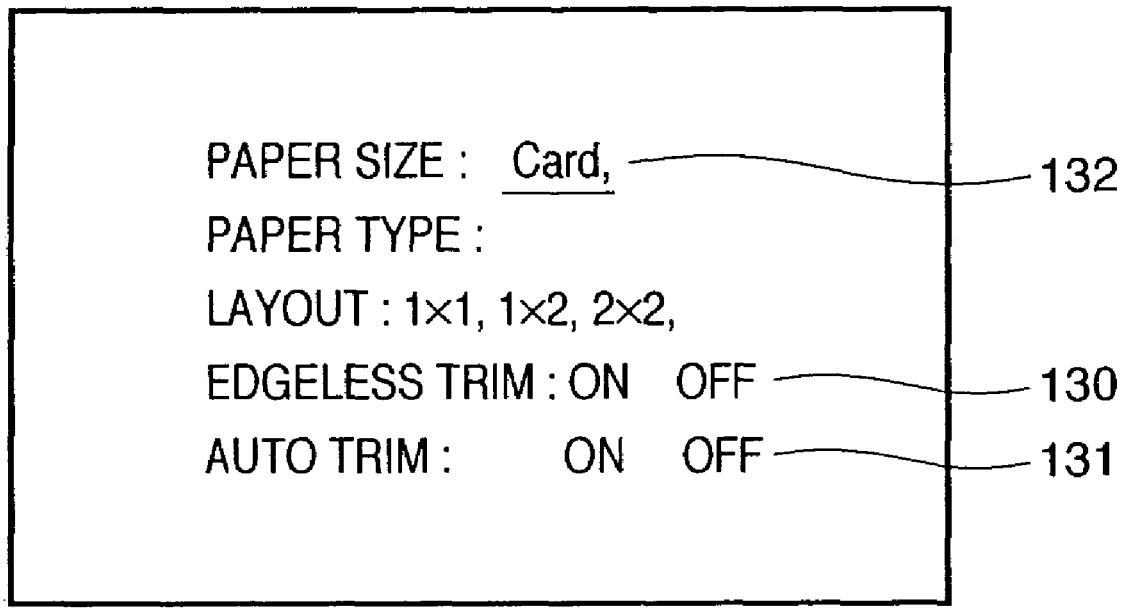
FIG. 13 depicts an explanatory view showing a display example of a user interface of the digital camera according to the present embodiment.

FIG. 13 shows an example of the UI screen displayed on the display unit 35 of the digital camera (DSC) 3012 according to this embodiment.

FIG. 13 shows an example of the UI screen, which allows a user to set on/off the edgeless trimming as indicated by numeral 130, or set on/off the automatic trimming as indicated by numeral 131. This example corresponds to the case of the fourth user interface (S1214) mentioned above.

In a case of the first user interface (S1206) which has neither the "edgeless trimming print" function nor the "automatic trimming print" function, the items 130 and 131 are not displayed at all, or displayed in gray so that a cursor 132 cannot be moved to the items 130 and 131. Furthermore, in a case of the second user interface (S1208) or the third user interface (S1211), only an item that can be set in the PD printer 1000 is displayed, or displayed as a selectable item.

As described above, according to the digital camera 3012 of the present embodiment, it is possible to provide a user with a user interface appropriate for the function that can be processed by the PD printer 1000, e.g., in this example, the type of trimming print method. Therefore, user-friendliness of the camera improves in the direct printing system.

Furthermore, according to the PD printer 1000 of the present embodiment, it is possible to directly inform the digital camera 3012 of the function that can be processed by the PD printer 1000.

Note, although the above embodiment assumes that the PD printer 1000 and the digital camera 3012 are directly connected through a digital interface compliant with the USB (Universal Serial Bus) standard, the present invention is not limited to this. The PD printer 1000 and the digital camera 3012 may be directly connected through a wireless interface compliant with the Bluetooth standard, IEEE802.11 standard, or the like.

The first embodiment can be practiced using an image input apparatus having the same functions as those of the DSC 3012 in place of the DSC 3012. Also, the first embodiment can be practiced using an image output apparatus having the same functions as those of the PD printer 1000 in place of the PD printer 1000.

Note that the present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium (or a recording medium), storing program codes of software realizing the functions of the above-described embodiment (processing performed by the camera side and various printing processing performed by the printer side), to a computer system or apparatus, reading the program codes by the computer system or apparatus (CPU or MPU) from the storage medium, then executing the program. In this case, the program codes read from the storage medium realize the functions according to the embodiment, and the storage medium storing the program codes constitutes the invention. Furthermore, besides aforesaid functions according to the above embodiment are realized by executing the program codes which are read by a computer, the present invention includes a case where an OS (operating system) or the like working on the computer performs a part or the entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or the entire processes in accordance with designations of the program codes and realizes functions of the above embodiment.

The present invention is not limited to the above embodiment and various changes and modifications can be made within the spirit and scope of the present invention. Therefore, to apprise the public of the scope of the present invention, the following claims are made.

What is claimed is:

1. A camera which is capable of directly transmitting a digital image to a printer, comprising:

an obtaining unit that obtains capability information from the printer, wherein the capability information includes information indicating what type of trimming print function the printer has;

a determination unit that determines, based on the capability information, whether the printer has at least one of a first trimming print function and a second trimming print function different from the first trimming print function;

a user interface selector that (a) selects a first user interface that is not able to control the first trimming print function and not able to control the second trimming print function, if the determination unit determines that the printer has neither the first trimming print function nor the second trimming print function, (b) selects a second user interface for controlling the second trimming print function, if the determination unit determines that the printer has the second trimming print function but does not have the first trimming print function, (c) selects a third user interface for controlling the first trimming print function, if the determination unit determines that the printer has the first trimming print function but does not have the second trimming print function, and (d) selects a fourth user interface for controlling the first trimming print function and the second trimming print function, if the determination unit determines that the printer has both the first trimming print function and the second trimming print function; and a display unit that (a) displays to a user of the camera the first interface if the user interface selector selects the first user interface, (b) displays to the user of the camera the second user interface if the user interface selector selects the second user interface, (c) displays to the user of the camera the third user interface if the user interface selector selects the third user interface, and (d) displays to the user of the camera the fourth user interface if the user interface selector selects the fourth user interface.

2. The camera according to claim 1, wherein the camera transmits a position and a size of a printing area to the printer so that the printer performs an automatic trimming print of the digital image, and
   wherein the position and the size of the printing area are set through one of the second user interface and the fourth user interface.

3. The camera according to claim 1, wherein the camera transmits a position, a size and a shape of a printing area to the printer so that the printer performs an automatic trimming print of the digital image, and
   wherein the position, the size and the shape of the printing area are set through one of the second user interface and the fourth user interface.

4. A method of controlling a camera which is capable of directly transmitting a digital image to a printer, comprising:
   an obtaining step of obtaining capability information from the printer, wherein the capability information includes information indicating what type of trimming print function the printer has;
   a determining step of determining, based on the capability information, whether the printer has at least one of a first trimming print function and a second trimming print function different from the first trimming print function;
   a first user interface selecting step of selecting a first user interface that is not able to control the first trimming print function and not able to control the second trimming print function, if it is determined in the determining step that the printer has neither the first trimming print function nor the second trimming print function;
   a second user interface selecting step of selecting a second user interface for controlling the second trimming print function, if it is determined in the determining step that the printer has the second trimming print function but does not have the first trimming print function;
   a third user interface selecting step of selecting a third user interface for controlling the first trimming print function, if it is determined in the determining step that the printer has the first trimming print function but does not have the second trimming print function;
   a fourth user interface selecting step of selecting a fourth user interface for controlling the first trimming print function and the second trimming print function, if it is determined in the determining step that the printer has both the first trimming print function and the second trimming print function;
   a first display step of displaying to a user of the camera the first user interface if the first user interface is selected in the first user interface selecting step;
   a second display step of displaying to the user of the camera the second user interface if the second user interface is selected in the second user interface selecting step;
   a third display step of displaying to the user of the camera the third user interface, if the third user interface is selected in the third user interface selecting step; and
   a fourth display step of displaying to the user of the camera the fourth user interface if the fourth user interface is selected in the fourth user interface selecting step,
   wherein the obtaining step, the determining step, the first through fourth user interface selecting steps and the first through fourth display steps are performed by the camera.

5. The method according to claim 4, further comprising:
   a transmitting step of transmitting a position and a size of a printing area to the printer so that the printer performs an automatic trimming print of the digital image,
   wherein the position and the size of the printing area are set through one of the second user interface and the fourth user interface, and
   wherein the transmitting step is performed by the camera.

6. The method according to claim 4, further comprising:
   a transmitting step of transmitting a position, a size and a shape of a printing area to the printer so that the printer performs an automatic trimming print of the digital image,
   wherein the position, the size and the shape of the printing area are set through one of the second user interface and the fourth user interface, and
   wherein the transmitting step is performed by the camera.

* * * * *